Figure 1:
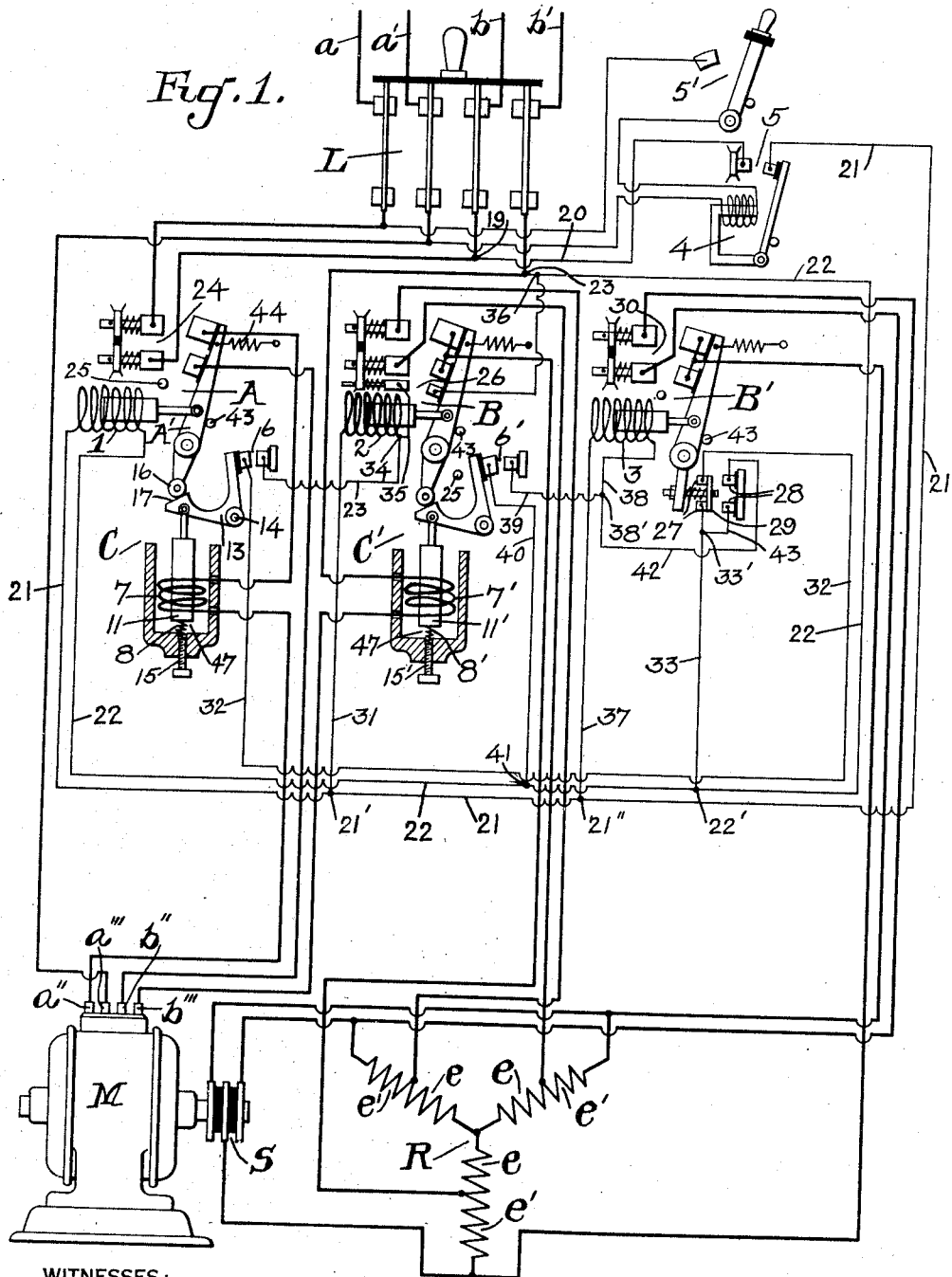

L. LARSEN.
MOTOR CONTROL.
APPLICATION FILED FEB. 3, 1916.

1,309,640.

Patented July 15, 1919.
2 SHEETS—SHEET 1.

WITNESSES:

INVENTOR
Louis Larsen
BY
ATTORNEYS

L. LARSEN.
MOTOR CONTROL.
APPLICATION FILED FEB. 3, 1916.
1,309,640.
Patented July 15, 1919.
2 SHEETS—SHEET 2.
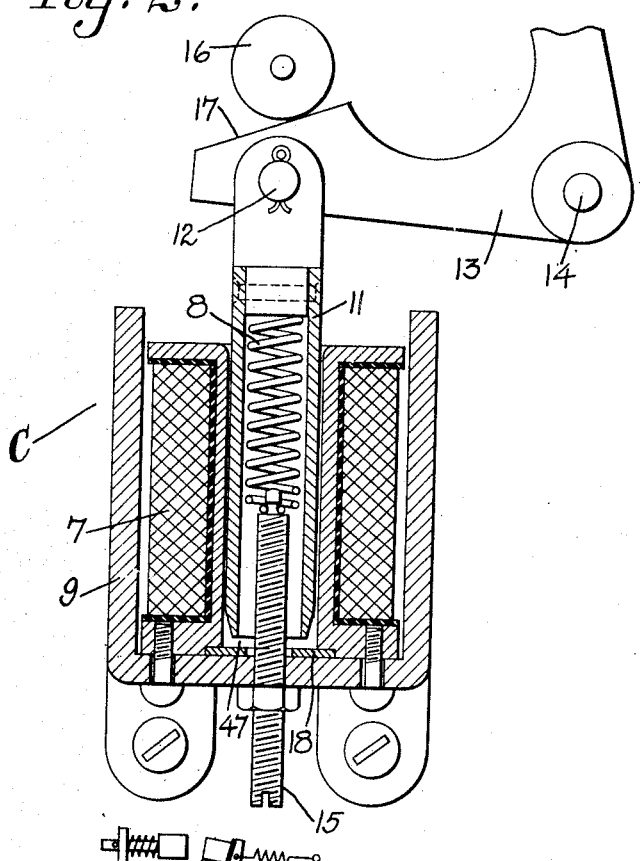
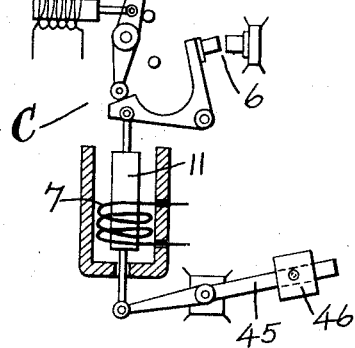

UNITED STATES PATENT OFFICE.

LOUIS LARSEN, OF BROOKLYN, NEW YORK, ASSIGNOR TO THE SUNDH ELECTRIC COMPANY, OF NEW YORK, N. Y., A CORPORATION OF NEW YORK.

MOTOR CONTROL.

1,309,640. Specification of Letters Patent. Patented July 15, 1919.

Application filed February 3, 1916. Serial No. 75,971.

*To all whom it may concern:*

Be it known that I, LOUIS LARSEN, a citizen of the United States, residing in Brooklyn, in the county of Kings and State of New York, have invented a new and useful Improvement in Motor Controls, of which the following is a specification.

My invention relates to apparatus for controlling an alternating current motor, but it should be understood that it may have a general application to direct, as well as alternating current systems of motor control.

The invention more essentially consists in the provision of simple and efficient means automatically to control an alternating current motor.

In the accompanying drawings, Figure 1 illustrates in more or less diagrammatic form, an alternating current system of motor control arranged in accordance with the present invention; Fig. 2 illustrates in detail a sectional view of a portion of certain apparatus illustrated in Fig. 1, and Fig. 3 illustrates diagrammatically a modified construction.

In Fig. 1 a translating device in the form of a multiphase motor is indicated by the reference letter M. The motor may be connected to the apparatus to be operated in any desired manner. A series of slip rings S on the motor shaft connect the motor circuits to a usual starting resistance, R, controlled automatically as will be hereinafter more fully described.

Main lines designated $a$, $a'$, $b$, $b'$, connect a source of supply to a main line switch L, the system herein shown being simply for the purpose of illustration; comprising a two phase four wire system, the leads $a$, $a'$, indicating one phase, and $b$, $b'$, another phase of the supply circuit.

The main line switch L, and an electromagnetic switch A, serve to connect stator terminals $a''$, $a'''$, $b''$, $b'''$, with the source of supply.

Electromagnetic switches B, B', operate successively in the order named to cut out the steps of starting resistance R.

The switches A, B and B' are each provided with operating windings designated 1, 2 and 3, respectively. A pair of auxiliary contacts 26, are controlled by the switch B, the switch B' controlling two sets of fixed contacts, 27, 28, adapted for engagement by spring pressed contact disk 29, carried by the switch arm. The contact disk 29 is adapted to engage the contacts 27 with the switch B' in normal or inoperated position, and to disengage the same and engage the contacts 28, just prior to the closing of the main contacts 30, comprising the switch B'.

A relay magnet 4, controls switch 5, the winding of the relay being controlled by a manually operable switch 5'.

The resistance controlling switches B, B', are controlled automatically, by means of relay devices C, C', respectively, each device involving what might be termed a differential action by means of which, switches 6 and 6', respectively are controlled.

The devices C and C' are mechanically interlocked with the switches A and B respectively. The devices C and C' are similar in construction; comprising a movable armature 11 11', respectively and elements which act in opposition to each other on the armature, or it may be said, exert opposing forces on the armature. One of these forces is exerted by what will be termed herein a series relay winding, 7 7', this force it may be said, being in accordance with the motor current, and the other force, which opposes the action of the series relay winding, being that exerted by a spring 8, 8', which may be adjustable.

One of these devices, such as C for example, is illustrated in detail in Fig. 2, it comprises a U-shaped magnet frame 9, which may be secured to a suitable supporting structure. The magnet winding 7 consisting of a small number of turns of heavy wire, is suitably secured to the magnet frame. A magnet armature 11 in the present instance, may be tubular in form, it being operatively connected at its upper end by a pin 12, to a bell crank lever 13, carried on a fixed pivot 14. The spring 8, urges the armature 11 upwardly, the tension of the spring being adjusted by means of an adjusting screw 15. A roller 16 carried by the switch arm A' coacts with a cam face 17 on the member 13, these elements forming a mechanical interlock which maintains the switch 6 open against the action of the spring 8 and allowing a small air gap such as 47 between the bottom of the armature and a stop 18, of non-magnetic material, the parts assuming these relative positions with the switch arm A' in normal or inoperated position as indicated in Fig. 1.

A complete cycle of operation of the various elements illustrated in Fig. 1, will now be given: In Fig. 1, the main line switch L is shown in closed position, the remaining elements assuming a normal or inoperated position. To start the motor M, the manually operative switch 5' is closed, thus establishing a circuit for the winding of the relay 4, which now attracts its armature, thereby closing the switch 5. The switch 5 establishes a circuit for the winding 1 of the electromagnet switch A, which circuit may be traced as follows: from junction 19 on lead *b*, wire 20, contacts 5, wire 21, winding 1, and thence to lead *b'*, at the junction 23, by way of wire 22. The winding 1 now receiving current will operate the switch A to close its contacts and thereby connect the motor M with the source of power supply.

It will be noted here that, the relay windings, 7, 7', associated with the devices C, C', respectively, are connected in different phases of the supply circuit and in series with the stator windings, these windings thus being subjected to the current variation of the stator windings. The movement of the switch arm A' in closing its contacts, causes the roller 16 through its engagement with the cam face 17, to seat or practically freeze the armature against the stop member 18, this being effected when the contacts carried by the switch arm A' initially engage the fixed spring pressed contacts which I will designate 24, the roller 16 at this instant of time bearing on the uppermost point or peak of the cam face, the continued movement thereafter of the switch arm causing the roller to ride off the cam face, there being provided a stop 25 to limit the movement of the said arm.

The motor we will say for example, will now run at a slow speed with all of the starting resistance R in circuit. The series relay winding 7 now receiving current exerts a downward pull on the armature (which is already seated by the closing movement of the switch arm A') against the opposing action of the spring 8, thus keeping the switch 6 open.

The spring 8 is so adjusted as to overcome the action of the relay winding 7, when the current in the latter is of a predetermined value corresponding to a normal full load, or drops below this value, and in this manner the armature 11 of the relay C is moved upwardly by the action of the spring, thereby closing the switch 6. The switch 6 together with the auxiliary contacts 27 and contact disk 29, establish a circuit for the winding 2 of the switch B, which circuit may be traced as follows: from the junction 21', wire 31 to winding 2, wire 23, contacts 6, wire 32, contacts 27, by way of disk 29, wire 33, and thence to junction 22'. The winding 2, now receiving current, will operate the switch B to close its contacts, and in this manner cut out the first step of starting resistance as indicated by the reference letter *e*.

It will be noted that the auxiliary contacts 26 controlled by the switch B, now establish a self holding circuit for the winding 2, which circuit may be traced from the junction 21', wire 31, winding 2, to junction 34, wire 35, contacts 26, to junction 36. This circuit is provided in order to prevent opening of the switch B, as might otherwise be occasioned by a sudden inrush of current causing the relay winding 7 to overcome the action of the spring 8, and in this manner actuate the armature 11 to open the switch 6, which establishes the initial circuit for the winding 2.

The switch B and device C', coact in exactly the same manner as the switch A and relay C, the current values determining the closing operation of the switch 6', by the spring 8', being the same as herein before pointed out in connection with the device C. Assuming now the switch 6' is closed, it establishes a circuit for the winding 3, which circuit may be traced from the junction 21'', wire 37, winding 3, wire 38, to junction 38', wire 39, switch 6', wire 40, to junction 41. The winding 3 now receiving current will operate the switch B' to close its main contacts 30, and also open circuit the contacts 27 and close circuit the contacts 28 by the disk 29, the latter operation being effected just prior to the closing of the main contacts 30. The main contacts 30 now cut out the last steps of resistance as designated by the reference letters *e'*, *e'*, *e'*, and the motor M will now run at its normal full speed, with all of the starting resistance now cut out of the motor circuit.

The contacts 28 now being engaged by the contact disk 29, establish a self holding circuit for the winding 3, which circuit is the same as that traced heretofore, to the junction 38', thence by wire 42, contacts 28, by way of the disk 29, wire 43, to junction 33', and wire 33 to junction 22'. This self holding circuit is provided in order to prevent opening of switch B', as might otherwise be occasioned by a sudden inrush of current causing the relay winding 7' to overcome the action of the spring 8', and in this manner actuate the armature 11' to open the switch 6' which establishes the initial circuit for the winding 3.

The motor is stopped by opening the switch 5', whereupon the parts will assume a normal position as indicated in Fig. 1, it being noted that stops 43 are provided for each of the switches, A, B, B', to limit their opening movement. Each switch may be provided if desired, with a suitable means such as a spring 44, to assist the action of gravity in opening the said switches, and returning the devices C and C' to normal positions.

In Fig. 3, a device such as C, is shown in modified construction, the spring 8 in this instance being eliminated, but there being provided in place thereof, a pivoted arm 45, connected to the armature 11, the arm carrying a weight 46, which is adjustable thereon. The weighted arm in this instance through its connection with the relay armature 11, performs the same function as the spring 8 in Fig. 2.

The apparatus herein illustrated provides a simple and efficient automatic motor starter or self starter, it being simple in adjustment to insure the cutting out of the starting resistance at only the proper time, it furthermore effecting the cutting out of the starting resistance successively in the order as intended or in steps. The automatic devices herein illustrated may have a wide range of uses, and it is obvious that one skilled in the art may make various other modifications in the details and arrangement of parts without departing from the spirit and scope of the invention.

What I claim as new and desire to protect by Letters Patent of the United States is:—

1. In a motor controlling apparatus, the combination of an electromagnetic switch, the switch comprising a pivoted lever, one arm thereof carrying contacts and the other arm, an anti-friction roller, adapted to serve as an interlocking element, an additional electromagnetic switch, comprising a pivoted lever, one arm thereof carrying contacts, and the other arm, a cam, the roller and cam being positioned relatively to each other, to bear against each other and permitting closing of the switches successively, an armature secured to the cam-bearing arm, and a spring adapted to move the armature, to move the contact-bearing arm to close the additional switch.

2. In a motor controlling apparatus, the combination of an electro-magnetically operable switch, the switch comprising two movable members, one member, bearing contacts, spring-backed contacts, coöperable with the movable-member contacts, an electro-magnet, an armature therefor, the latter connected to move the switch member to cause its contacts to close against the spring backed contacts and upon further movement, to compress the springs, the other member adapted to bear against a cam, and upon compression of the said springs, to ride off of the cam, an additional electro-magnetically operable switch, comprising two members, one, bearing contacts, and the other, a cam, mentioned above, an electro-magnet and an armature therefor, secured to the additional switch, a spring compressed against the armature, to close the said switch.

3. In a motor controlling apparatus, the combination of a motor, a source of current supply therefor, an electro-magnetically operable switch, adapted to be inserted between the motor and its source of supply, the switch comprising a lever, bearing contacts on one of its arms, spring backed contacts, coöperable with the arm-bearing contacts, a solenoid and core, the latter attached to the lever, to move the arm-borne contacts against the spring-backed contacts, the other arm of the lever, bearing an anti-friction roller, an additional electro-magnetically operable switch, comprising an elbow lever, one arm of the lever bearing contacts, and the other arm being shaped to form a cam, the roller and the cam being adapted to bear against each other, and further, the roller to roll off of the cam at one end thereof, a solenoid and core, the solenoid being connected in the motor circuit, the core secured at one end of the elbow lever, a spring, compressed against the other end of the core, tending to close the additional switch and the roller tending to keep it open, until it rides off of the cam.

In testimony whereof, I have signed my name to this specification in the presence of two subscribing witnesses.

LOUIS LARSEN.

Witnesses:
WALTER C. STRANG,
JAMES G. BETHELL.